United States Patent Office 3,422,416
Patented Jan. 14, 1969

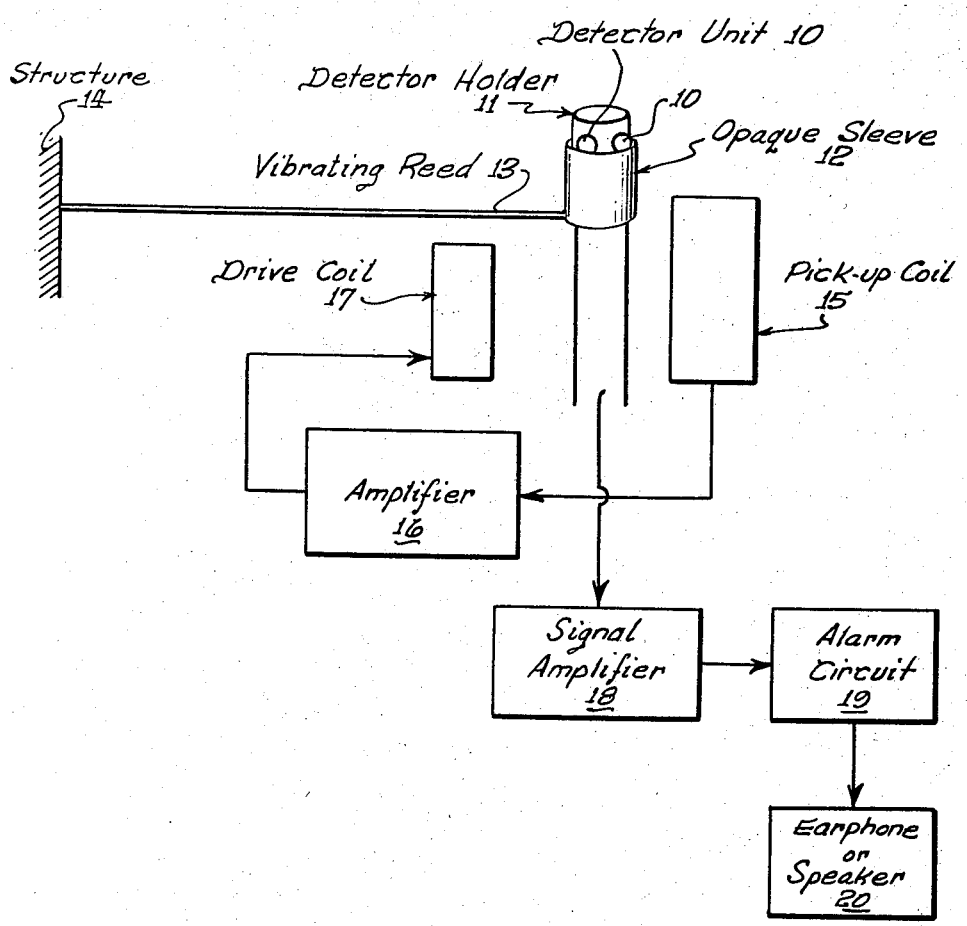

3,422,416
RADIANT ENERGY DETECTION SYSTEM USING RECIPROCATING MEANS SURROUNDING THE DETECTOR
Lloyd Gastineau, Claremont, Calif., assignor to General Dynamics Corporation, a corporation of Delaware
Filed Aug. 25, 1966, Ser. No. 575,076
U.S. Cl. 340—258     5 Claims
Int. Cl. G08b 13/00; H01j 3/14

This invention relates to detector systems, and more particularly to detector systems which provide an output signal, such as an alarm, when illuminated with visual or infrared radiation from any azimuth angle.

A simple and economical system has long been desired for detecting intruders in homes, businesses, and classified areas. While various systems have been proposed, no prior known detector system is commercially available which will serve this purpose.

Therefore, it is an object of this invention to provide a detector system.

A further object of the invention is to provide a detector system which can be economically produced.

Another object of the invention is to provide a detector system which produces an alarm when illuminated with visual or infrared radiation from any azimuth angle.

Another object of the invention is to provide a detector system which utilizes an opaque sleeve reciprocated by a vibrating reed.

Other objects of the invention not specifically set forth above will become readily apparent from the following description and accompanying drawing wherein:

The single figure schematically illustrates the invention.

Broadly, the invention is directed to a radiant energy detection system adapted to provide an alarm signal when illuminated with radiation from any azimuth angle. The detection system essentially comprises a radiant energy detector which is generally cylinder-shaped so as to be responsive to incident radiation from any azimuth angle, an opague sleeve positioned about the detector and adapted in reciprocating shutter fashion to alternately cover and uncover the detector element in accord with the oscillating frequency of a vibrating reed to which the sleeve is attached, suitable pickup coil, drive coil and amplifying means adapted to oscillate the reed-sleeve system at its mechanically resonant frequency, and appropriate alarm circuitry which is actuated in response to the detection of incident radiant energy.

Referring now to the drawing, the basic elements of the inventive detection system are illustratetd schematically. When visual or infrared radiation falls on detector units 10 located in detector holder 11, the radiation is interrupted by an opaque sleeve 12 which is moved up and down by a vibrating reed 13 which is attached at one end to detector holder 11 and attached at the opposite end to a fixed support structure 14. The reed 13 is forced to oscillate at the resonant frequency associated with the mechanical resonance of the reed and a feedback circuit. The feedback circuit is composed of a pickup coil 15, an amplifier 16, and a drive coil 17, the feedback circuit being powered by a source not shown. The signals produced at the detectors 10 have a fundamental frequency which corresponds to the vibrational frequency of the reed 13. This detected signal indicated by the arrow is amplified by the signal amplifier 18 which is then applied to an alarm circuit 19 which gives an audio alarm signal out of the earphone or loudspeaker indicated at 20. Since the operation of the amplifier-output circuit (elements 18, 19 and 20) are known to those skilled in the art, an explanation of this is deemed unnecessary. In the present embodiment, the reed 13 and the opaque sleeve 12 are made of a magnetic material. The pickup coil 15 is wound about a magnet which provides a magnetic bias; therefore, any motion of the reed and sleeve changes the magnetic flux passing through the pickup coil 15 and thus induces a voltage in the pickup coil. This signal is amplified by amplifier 16 and applied to the drive coil 17 which applies a force to the reed 13. This feedback arrangement supplies the energy required to maintain a continuously vibrating reed.

The detector system has a continuous 360° azimuth coverage by using three or more detector units 10 in the detector holder 11. In the embodiment illustrated, the detector units 10 are arranged behind small windows which are spaced approximately 120° in azimuth about the detector holder 11. The type of detector unit 10 utilized will be dependent on the type of radiation and the sensitivity desired. For example, these units may be PbS cells, PEM (photoelectromagnetic InSb cells, or other types.

By driving the opaque sleeve 12 from the vibrating reed 13 it is possible to interrupt radiation from any azimuth angle without obstructing a portion of the viewing field as is the case with the conventional chopper wheels or reeds. An added advantage is the low power requirements for the unit. In a constructed embodiment of the inventive detector system, for example, the power required to drive the reed is less than 4 milliwatts while the total system power requirements are less than 10 milliwatts. The system can be battery powered and quite small. The constructed embodiment has a volume less than 7 cubic inches and the weight is less than 4 ounces.

By using proper optical filtering the system can be made sensitive to any region (ultraviolet, visual, or infrared) of the optical spectrum. In addition, the output response need not be an acoustical alarm, but can provide a control signal for other types of alarms or control function.

It has thus been shown that this invention provides a simple and economical detector system when illuminated with radiation from various regions of the optical spectrum from any azimuth angle.

Although a specific embodiment of the invention has been illustrated and described, modifications will become apparent to those skilled in the art, and it is intended to cover in the appended claims all such modifications as come within the true spirit and scope of the invention.

What I claim is:

1. A radiant energy detection system adapted to provide an output signal when illuminated with radiation from any azimuth angle comprising: radiant energy detector means, a vibrating reed mounted on a support structure adjacent said detector means and carrying modulation means surrounding said detector means to alternatively cover and uncover said detector means in reciprocating fashion, feedback circuit means adapted to vibrate said reed means at its mechanical resonant frequency, and circuit means adapted to utilize signals from said detector means.

2. The detection system defined in claim 1, wherein said modulation means is an opaque sleeve.

3. The detection system defined in claim 1, wherein said detector means includes a detector holder and a plurality of detector units.

4. The detection system defined in claim 1, wherein said feedback circuit means includes a pickup coil, an amplifier, and a drive coil.

5. The detection system defined in claim 1, wherein said signal utilizing circuit means includes an amplifier, an alarm circuit, and acoustical alarm means.

References Cited

UNITED STATES PATENTS

| | | | |
|---|---|---|---|
| 2,198,725 | 4/1940 | Smith | 250—237 X |
| 2,202,060 | 5/1940 | Mitchell | 340—228 |
| 2,505,316 | 4/1950 | Wilmotte et al. | 250—237 X |
| 2,945,959 | 7/1960 | Atkinson | 250—237 |
| 3,093,743 | 6/1963 | Inderwiesen | 250—232 |

JAMES W. LAWRENCE, *Primary Examiner.*

V. LAFRANCHI, *Assistant Examiner.*

U.S. Cl. X.R.

250—232, 235, 237